(12) United States Patent
Peterson et al.

(10) Patent No.: US 9,425,720 B2
(45) Date of Patent: Aug. 23, 2016

(54) ELECTRIC MOTOR AND MOTOR CONTROL

(71) Applicant: Nidec Motor Corporation, St. Louis, MO (US)

(72) Inventors: Gregory A. Peterson, Elgin, IL (US); Michael P. Sullivan, Elgin, IL (US); Stephen J. Burton, Fenton, MO (US); Gary E. Horst, Manchester, MO (US); Keith I. Hoemann, Fenton, MO (US); Richard J. Fadler, St. Charles, MO (US)

(73) Assignee: Nidec Motor Corporation, St. Louis, MO (US)

(*) Notice: Subject to any disclaimer, the term of this patent is extended or adjusted under 35 U.S.C. 154(b) by 248 days.

(21) Appl. No.: 14/067,670

(22) Filed: Oct. 30, 2013

(65) Prior Publication Data

US 2014/0055063 A1    Feb. 27, 2014

Related U.S. Application Data

(63) Continuation of application No. 12/852,166, filed on Aug. 6, 2010, now Pat. No. 8,575,873.

(51) Int. Cl.

| | | |
|---|---|---|
| *H02P 6/22* | (2006.01) | |
| *H02P 6/00* | (2016.01) | |
| *H02P 27/04* | (2016.01) | |
| *H02P 1/42* | (2006.01) | |
| *H02P 6/10* | (2006.01) | |
| *H02P 25/04* | (2006.01) | |

(52) U.S. Cl.
CPC ........ *H02P 6/002* (2013.01); *H02P 1/42* (2013.01); *H02P 6/10* (2013.01); *H02P 6/22* (2013.01); *H02P 25/04* (2013.01); *H02P 27/04* (2013.01)

(58) Field of Classification Search
CPC ............... H02P 6/00; H02P 6/20; H02P 6/22
USPC ........... 318/400.01, 400.02, 400.03, 400.11, 318/400.12, 400.14, 400.34, 700, 720–724
See application file for complete search history.

(56) References Cited

U.S. PATENT DOCUMENTS

| | | | | |
|---|---|---|---|---|
| 4,563,620 A * | 1/1986 | Komatsu | .............. | H02K 21/145 318/400.11 |
| 5,434,491 A * | 7/1995 | Marioni | .................. | H02P 1/465 318/700 |
| 5,598,071 A * | 1/1997 | Dunfield | ................. | H02K 29/03 318/400.11 |
| 6,239,563 B1 * | 5/2001 | Kunz | ...................... | H02P 1/465 318/400.07 |

* cited by examiner

*Primary Examiner* — Bentsu Ro
(74) *Attorney, Agent, or Firm* — Hovey Williams LLP

(57) ABSTRACT

Various embodiments of an electric motor and electronic control for an electric motor are disclosed. An exemplary electric motor comprises a single-phase brushless permanent magnet electric motor. In exemplary embodiments, the electronic motor control is configured to commutate an electric motor at a frequency other than line frequency, perform pulse width modulation, and drive the electric motor with a drive waveform that approximates the counter-electromotive force of the motor.

19 Claims, 9 Drawing Sheets

| Index | Duty-Cycle |
|---|---|
| 0 | 0 |
| 1 | 1.624769368 |
| 2 | 3.252305278 |
| 3 | 4.885344422 |
| 4 | 6.526564055 |
| 5 | 8.178552931 |
| 6 | 9.843782998 |
| 7 | 11.52458213 |
| 8 | 13.22310811 |
| 9 | 14.94132408 |
| 10 | 16.68097572 |
| 11 | 18.4435703 |
| 12 | 20.23035776 |
| 13 | 22.04231415 |
| 14 | 23.8801273 |
| 15 | 25.74418507 |
| 16 | 27.63456614 |
| 17 | 29.55103356 |
| 18 | 31.49303087 |
| 19 | 33.45968108 |
| 20 | 35.44978833 |
| 21 | 37.46184228 |
| 22 | 39.49402515 |
| 23 | 41.54422139 |
| 24 | 43.61002983 |
| 25 | 45.68877818 |
| 26 | 47.77753983 |
| 27 | 49.87315269 |
| 28 | 51.97223998 |
| 29 | 54.07123268 |
| 30 | 56.16639354 |
| 31 | 58.2538424 |
| 32 | 60.32958246 |

Figure 7A

| Index | Duty-Cycle |
|---|---|
| 33 | 62.38952752 |
| 34 | 64.42952966 |
| 35 | 66.44540736 |
| 36 | 68.43297362 |
| 37 | 70.38806393 |
| 38 | 72.30656386 |
| 39 | 74.18443592 |
| 40 | 76.01774559 |
| 41 | 77.8026862 |
| 42 | 79.5356025 |
| 43 | 81.21301268 |
| 44 | 82.83162871 |
| 45 | 84.38837476 |
| 46 | 85.88040367 |
| 47 | 87.30511122 |
| 48 | 88.66014812 |
| 49 | 89.94342972 |
| 50 | 91.15314331 |
| 51 | 92.28775292 |
| 52 | 93.34600174 |
| 53 | 94.32691206 |
| 54 | 95.22978279 |
| 55 | 96.05418459 |
| 56 | 96.7999528 |
| 57 | 97.46717811 |
| 58 | 98.05619513 |
| 59 | 98.56756912 |
| 60 | 99.00208086 |
| 61 | 99.36070994 |
| 62 | 99.64461662 |
| 63 | 99.85512241 |
| 64 | 99.99368972 |

Figure 7B

ELECTRIC MOTOR AND MOTOR CONTROL

RELATED APPLICATION

This is a continuation of U.S. Pat. No. 8,575,873, issued on Nov. 5, 2013, entitled ELECTRIC MOTOR AND MOTOR CONTROL, which was filed as U.S. application Ser. No. 12/852,166 on Aug. 6, 2010, entitled ELECTRIC MOTOR AND MOTOR CONTROL. The above-mentioned patent and application are hereby incorporated by reference into the present application in their entireties.

FIELD OF THE INVENTION

The present invention is generally directed toward the field of electric motors and electric motor control. More specifically, the present invention is directed to electronic commutation of brushless electric motors.

BACKGROUND AND SUMMARY

Many applications require a low-cost, low-power electric motor. Exemplary applications include small appliances, such as dishwashers, and pumps for use in spas and pools. In such applications, it is common to use the following motor types: permanent magnet ("PM") synchronous electric motor, three-phase brushless permanent magnet (BPM) motors, and induction motors.

These motor types suffer from various disadvantages. For example, a PM synchronous electric motor is limited to commutation at the same frequency as the AC line-in (e.g. 60 Hz in the US and 50 Hz in Europe). This causes audible noise because the human ear is sensitive to vibrations at or near these frequencies (and/or harmonics of these frequencies). Moreover, a PM synchronous motor is generally limited to a single speed.

A two-phase or three-phase BPM motor may produce less audible noise than a PM synchronous motor, and may be operated at variable speeds. However, disadvantages of two-phase and three-phase BPM motors include higher cost and complexity.

Advantages of single-phase BPM motors include lower cost and reduced complexity relative to two-phase or three-phase BPM motors. However, the industry has avoided the use of a single-phase BPM motors in many applications (including dishwashers) due to two primary problems: (1) noise related to the fundamental frequency (e.g. 50 Hz or 60 Hz), and (2) noise caused by torque ripple. The inventors herein have developed innovative techniques for overcoming each of these problems in single-phase BPM motors.

Exemplary embodiments disclosed herein include an innovative single-phase electric motor that can be electronically commutated at frequencies other than the AC line-in frequency. For example, an exemplary system disclosed herein includes a single-phase BPM electric motor that is electronically commutated at 50 Hz or less. In an exemplary embodiment the motor is electronically commutated at 38 Hz. One advantage of this innovative technique is a reduction in human-audible noise levels during motor operation.

Exemplary embodiments disclosed herein include innovative techniques for shaping the drive waveform for powering an electric motor to approximate the counter-electromotive force of the electric motor. Advantages of this wave shaping technique include improved motor efficiency resulting in higher torque at a given electric power level (torque per amp), and reduction in human-audible noise levels. Advantages of this wave shaping technique also include reduction of vibration due to torque ripple.

BRIEF DESCRIPTION OF THE DRAWINGS

FIGS. 7A-7B depict an exemplary drive waveform look-up table.

DETAILED DESCRIPTION OF THE PREFERRED EMBODIMENTS

Figure 1:
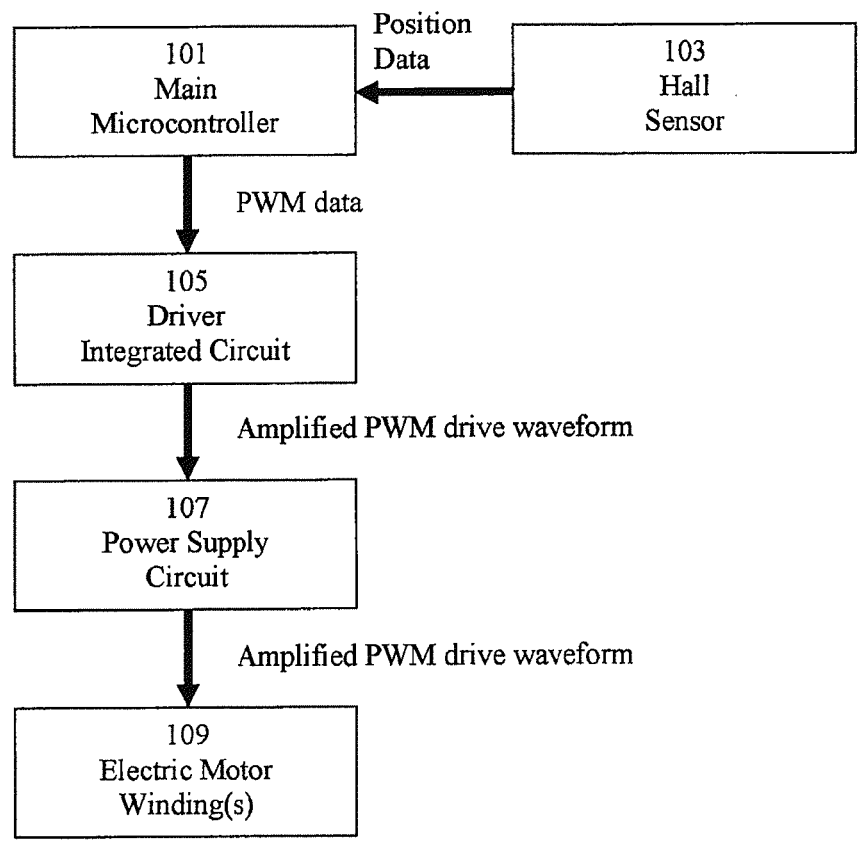
FIG. 1 depicts a block diagram of an exemplary embodiment.

FIG. 1 depicts a block diagram of an exemplary system for controlling an electric motor. The motor control system may be disposed in the same housing as an electric motor, separate from the electric motor, or integrated with a main control system for a device or appliance. The electric motor comprises one or more windings 109. Main microcontroller 101 executes a motor control software program for controlling the power delivered to the winding(s) 109 of an electric motor. Main microcontroller 101 receives position data from Hall sensor 103. As is well known in the art, Hall sensors are designed to detect the proximity of a magnetic pole, and are often used in electric motors to detect the position of a rotor comprising a permanent magnet. The motor control software includes routines for controlling an electric motor based on received input data, including the received position data from the Hall sensor 103. The motor control software generates a drive waveform to be applied to the electric motor winding(s) 109. Driver integrated circuit 105 comprises amplification circuitry for amplifying the voltage of the drive waveform received from the Main Microcontroller 101. The amplified voltage is applied to the power supply circuit 107. Power supply circuit 107 may comprises a split rail topology, as is known in the art. The drive waveform is applied to the electric motor winding(s) 109. Main Microcontroller 101 preferably comprises a pulse width modulation (hereinafter PWM) routine for generating a series of drive pulses as is known in the art.

In an exemplary embodiment, Main Microcontroller 101 stores a BEMF (Back ElectroMotive Force) look-up table that contains a digital representation of a counter-electromotive force associated with the electric motor. The BEMF look-up table may be generated by manually spinning the shaft of the motor and recording the resulting BEMF waveform. This can be done using a commercially available oscilloscope that is capable of recording data to a computer-readable medium such as a USB flash drive. The BEMF look-up table contains "n" data points. Each data point comprises a rotor position index and a corresponding dutycycle percentage value. In an exemplary embodiment, the BEMF look-up table comprises 256 data points. An exemplary BEMF look-up table comprising 64 data points is shown in FIGS. 7A-7B.

Figure 2:
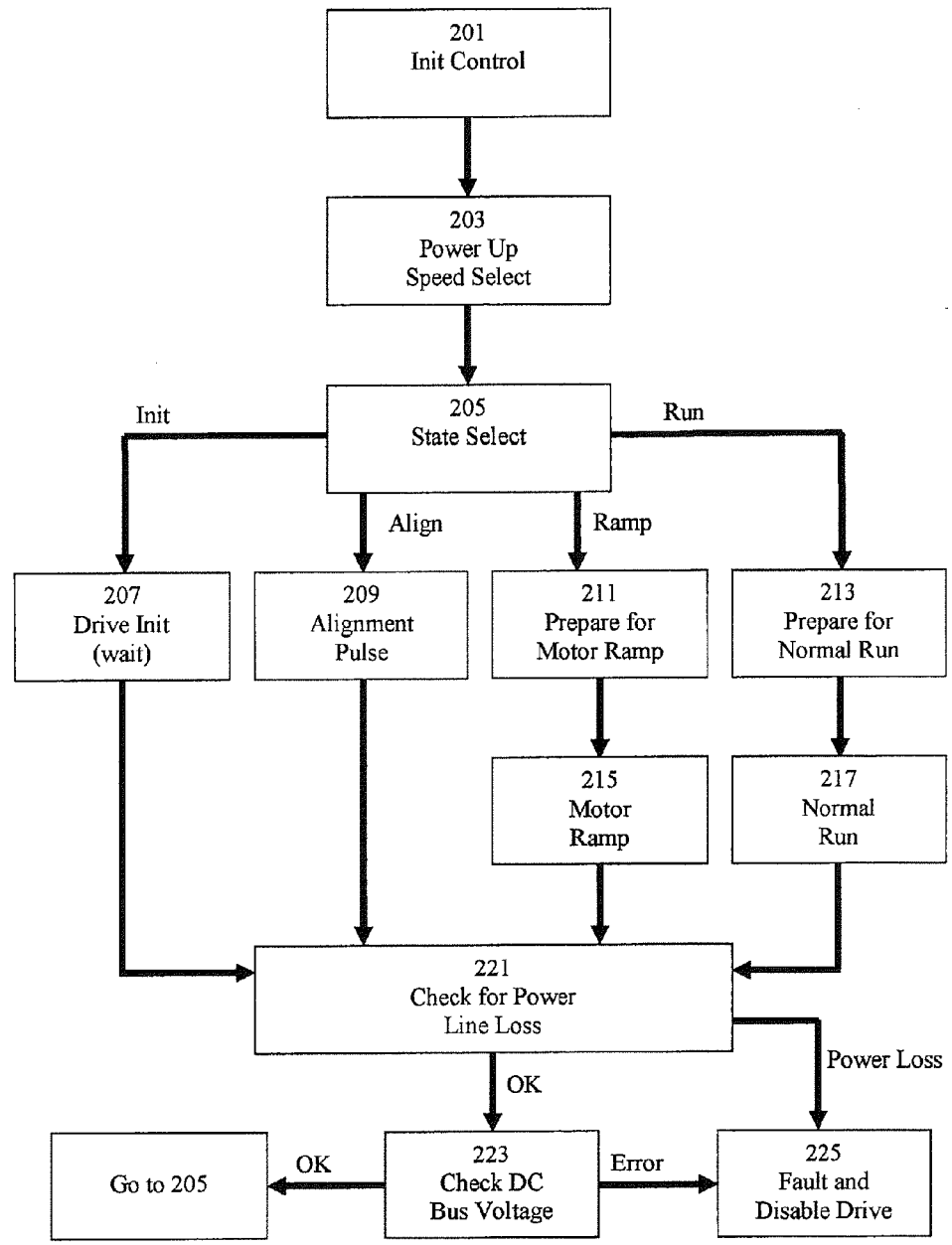
FIG. 2 depicts the main flow control in an exemplary embodiment.

FIG. 2 depicts a flow control for a main control routine in an exemplary embodiment. At stage 201 the system main microcontroller initializes the motor control software program. At stage 203 the system determines which speed profile to execute. Profile selection may be performed according to control commands received from an external source, such as a main appliance control circuit. Communication of control commands may be achieved using any communication technique known in the art. An exemplary communication technique based on power cycling is disclosed in U.S. Pat. No. 8,487,577 entitled "Method and Apparatus for Motor Control", issued Jul. 16, 2013, the entire contents of which are incorporated by reference herein.

At stage 205 the system determines the appropriate stage for motor operation. If the system is waiting for a command to run the electric motor, then flow proceeds to Drive Init (wait) stage 207. If the system has received a command to run the electric motor, and the electric motor is currently stopped, then flow proceeds to Alignment Pulse stage 209. If the system has already performed the Alignment Pulse stage 209, then flow proceeds to Prepare for Motor Ramp stage 211. If the system has already performed the Motor Ramp stages 211 and 215 for the current speed setpoint, then flow proceeds to Prepare for Normal Run stage 213. In an exemplary embodiment, the system will execute Motor Ramp stages 211 and 215 whenever the speed setpoint increases.

At Drive Init stage 207 the system waits for further instructions.

At Alignment Pulse stage 209, the system delivers an alignment pulse to the electric motor. The alignment pulse may comprise a single-polarity pulse width modulation (PWM) burst. An exemplary alignment pulse 507 is shown in FIG. 5B. The alignment pulse puts the electric motor rotor 403 in a start position, as shown in FIG. 4B.

At Prepare for Motor Ramp stage 211, the system calculates the ramp-up RPM and voltage. This calculation depends on the previously selected speed profile.

At Motor Ramp stage 215 the system delivers a ramp-up drive waveform having a gradually increasing frequency of commutation. The ramp-up drive waveform may comprise a plurality of pulse width modulation (PWM) bursts delivered with alternating polarity and in gradually increasing frequency. An exemplary ramp-up drive waveform 509 is shown in FIG. 5B.

At Prepare for Normal Run stage 213 the system calculates the voltage based on the selected speed profile and the measured speed of the motor. In an exemplary embodiment, the system employs a PID (Proportional, Integral, Derivative) control approach, as is well known in the art. The selected speed profile determines the setpoint for the proportional, integral, derivative (PID) subroutine. In such an embodiment, the system calculates a speed error as the difference between the speed setpoint from the selected speed profile and the measured motor speed. The speed error is used as an input to a PID control routine that calculates the desired drive voltage amplitude. The PID constants may be selected by the motor manufacturer depending on the application.

At Normal Run stage 217 the system delivers a normal run drive waveform having a steady frequency of commutation. An exemplary run drive waveform 511 is shown in FIG. 5B.

At stage 221 the system checks for loss of power of the AC line-in. If power has been lost then flow proceeds to stage 223. If power is within an acceptable range, then flow proceeds to stage 225.

At stage 223 the system checks the DC bus voltage. If the DC bus voltage is outside an acceptable range than flow proceeds to step 225. If the DC bus voltage is acceptable then flow proceeds to stage 205.

At stage 225 the system registers a fault condition and disables the drive power to the electric motor.

Figure 3:
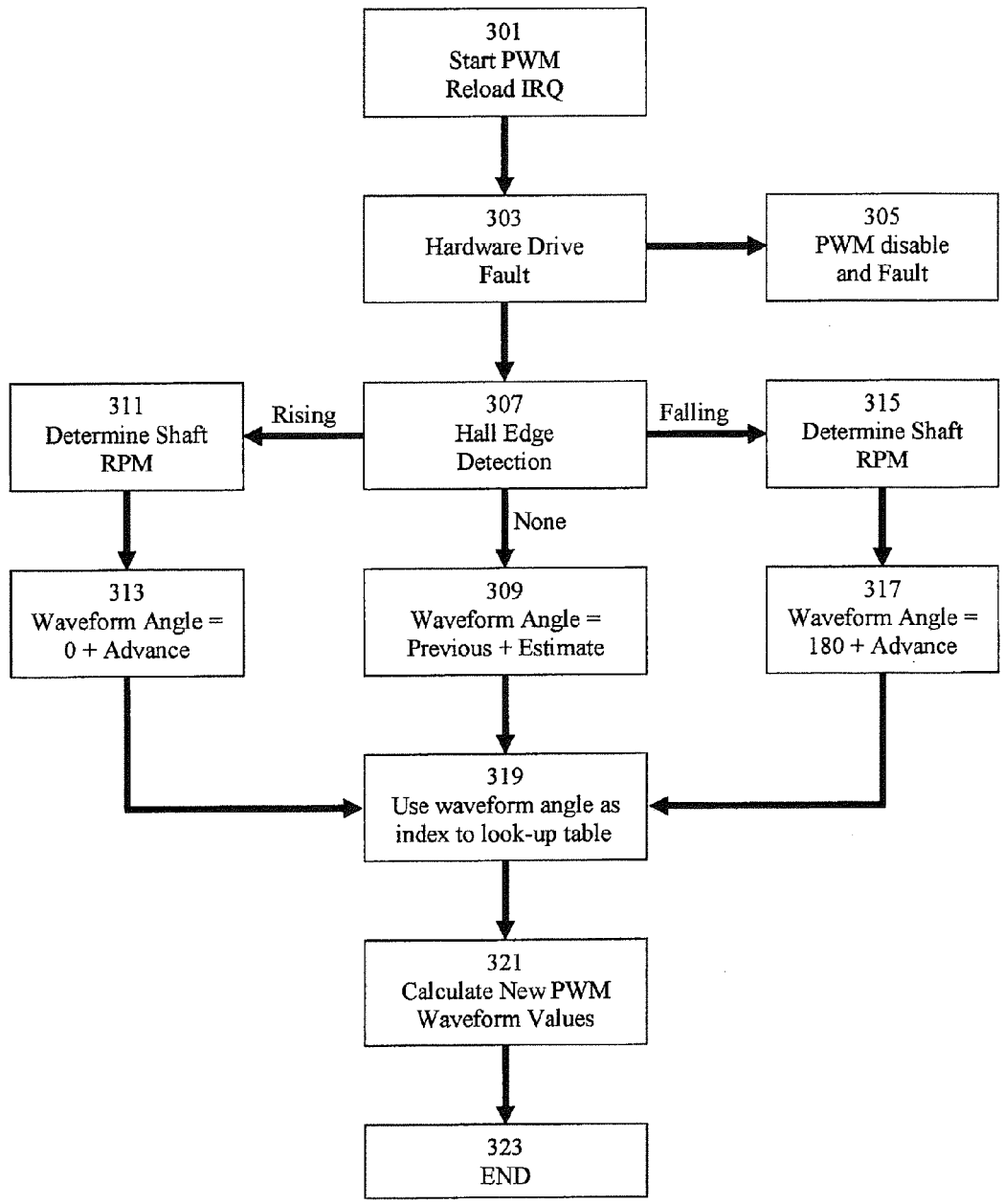
FIG. 3 depicts the drive waveform generation flow control in an exemplary embodiment.

FIG. 3 depicts a flow control for a motor control interrupt service routine for drive waveform in generation according to an exemplary embodiment. In the exemplary embodiment of FIG. 3, the motor control software program creates a drive waveform via pulse width modulation (PWM). At stage 301 the system begins powering the electric motor with a PWM drive waveform. At step 303 the system checks for an overcurrent or overvoltage condition. If a fault condition is detected, flow proceeds to stage 305. Otherwise, flow processed to stage 307. At stage 307 the system receives position information from a Hall sensor (e.g. Hall sensor 103). The system determines whether a transition of magnetic pole has been detected. A Hall sensor may be configured in a latching configuration wherein the Hall sensor will output a "1" after detecting a magnetic pole, and output a "0" after detecting a different magnetic pole. When the Hall sensor transitions from a "0" to a "1" this is considered a "rising" edge, and when the Hall sensor transitions from a "1" to a "0" this is considered a "falling" edge. As shown in FIG. 3, if a rising edge is detected then flow proceeds to stage 311, if a falling edge is detected then flow proceeds to stage 315, and if no edge is detected (Hall sensor output same as previous iteration), then flow proceeds to stage 309. At stages 311 and 315 the system determines the shaft rotations per minute ("RPM") based on the time between the last detected Hall edge.

As is well known in the art, an Advance Angle can be calculated based on the determined shaft RPM. Advance Angle increases with increasing RPM and is used to overcome electric motor internal impedance and counter-electromotive force (BEMF) which increases with RPM.

At stage 313 the system sets the waveform angle (Theta) to zero degrees plus an Advance Angle, as shown in Equation (1).

$$\text{Theta}=0+\text{Advance\_Angle} \quad \text{Equation (1):}$$

At stage 317 the system sets the waveform angle (Theta) to 180 degrees plus an Advance Angle, as shown in Equation (2).

$$\text{Theta}=180+\text{Advance\_Angle} \quad \text{Equation (2):}$$

At stage 309 the system sets the waveform angle equal to the previous waveform angle plus an estimated rotation of the rotor since the previous iteration. The estimated rotation of the rotor may be calculated based on the motor speed setpoint, as shown in Equation (3).

$$\text{delta-Theta setpoint\_RPM}/(360*\text{delta-Time}) \quad \text{Equation (3):}$$

The new waveform angle (Theta) can then be calculated as shown in Equation (4).

$$\text{Theta}=\text{Theta\_previous}+\text{delta-Theta} \quad \text{Equation (4):}$$

At stage 319 the system uses the calculated waveform angle (Theta) as an index into the drive waveform look-up table to retrieve a table value. As noted above, the drive waveform look-up table may be a BEMF look-up table having "n" data points. In an exemplary embodiment, the 360 degrees of rotor position are evenly mapped to the "n" data points of the BEMF look-up table. For example, if the BEMF look-up table comprises 256 data points, then the 360 degrees of rotation of the rotor would be evenly distributed to 256 index values.

At stage 321 the system uses the retrieved table value to determine a PWM duty cycle for the drive waveform. Thus, the result of the drive waveform generation interrupt service routine is a single PWM duty-cycle. At stage 323 the interrupt service routine ends. In an exemplary embodiment, the interrupt service routine is executed at a frequency of 16 kHz.

Figure 4A:
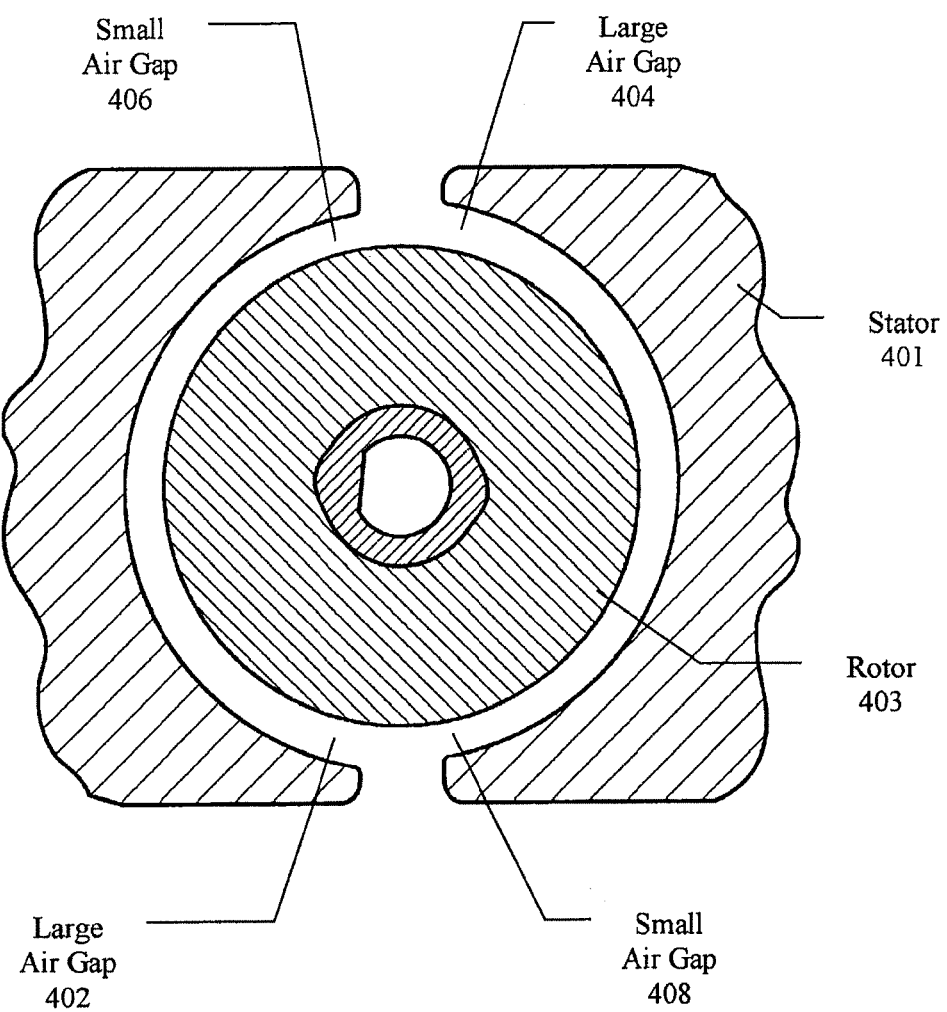
FIG. 4A depicts an exemplary cross-section of a rotor and stator in an exemplary electric motor.
Figure 4B:
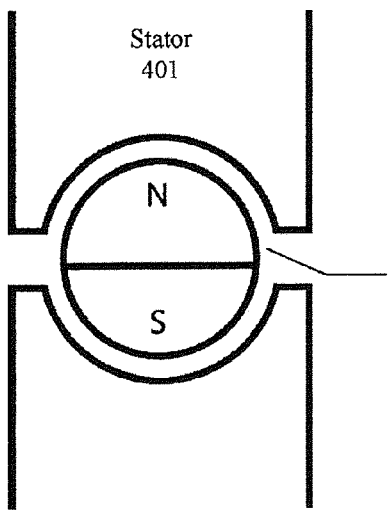
FIGS. 4B-4D depict the rotor position in an electric motor in an exemplary embodiment.

FIG. 4A depicts an exemplary cross-section of a rotor and stator in an exemplary electric motor. The motor has an eccentric air gap between the rotor and stator such that there exists a difference between the length of large air gaps 402 and 404 and small air gaps 406 and 408.

FIG. 4B depicts an exemplary start position for rotor 403 when an alignment pulse is applied to the motor winding(s). Stator 401 may comprise layered iron laminations as is known in the art. Rotor 403 comprises a permanent magnet having at least one North-South pole pair (i.e. at least two poles). Rotor 403 may comprise multiple pole pairs (e.g. 4 poles or 6 poles).

Figure 4C:
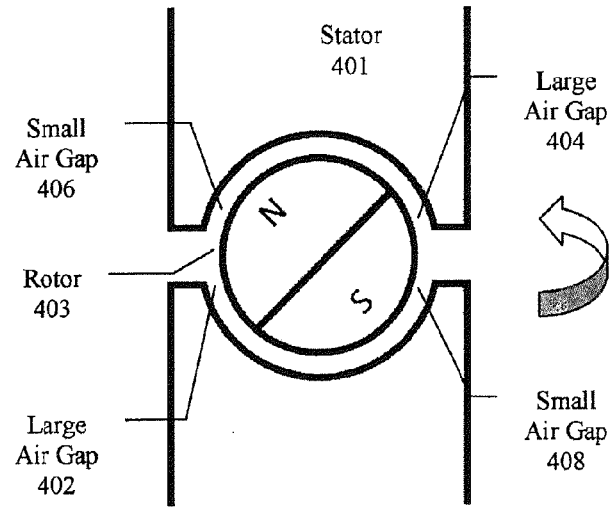

FIG. 4C depicts an exemplary detent position for rotor 403 when an alignment pulse is removed. When the alignment pulse is removed, the eccentric air gap between rotor and stator will always swing to a position that minimizes the air gap between the poles and the stator. At this stage, the rotor has angular momentum that will tend to carry the motor in a counterclockwise direction. Thus, by application and removal of the alignment pulse, the motor can be reliably started in a preferred start direction. In the exemplary embodiment of FIGS. 4B-4D, the preferred start direction is counterclockwise as shown.

Figure 4D:
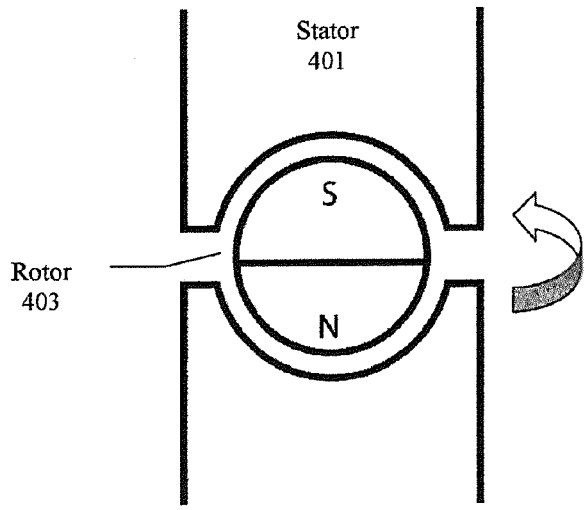

FIG. 4D depicts an exemplary position for rotor 403 during normal operation after the start-up sequence as the rotor continues to rotate counter-clockwise.

Figure 5A:
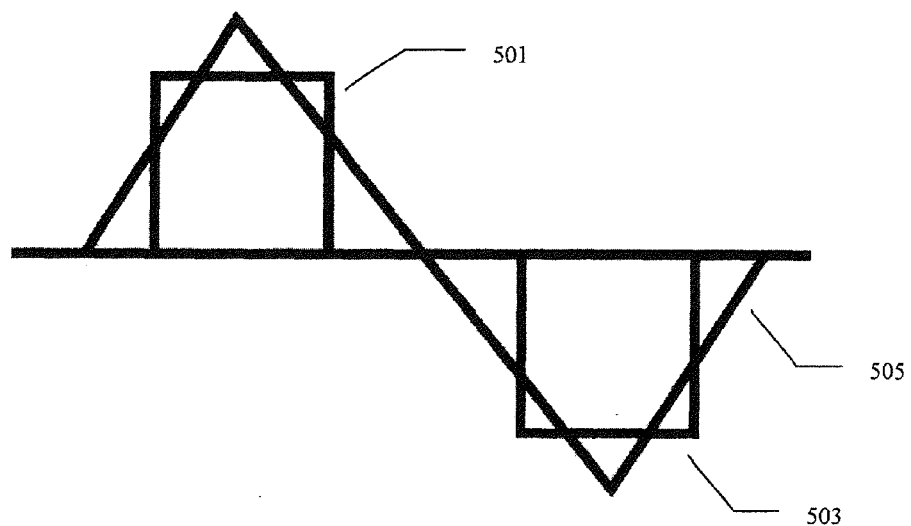
FIGS. 5A-5B depict waveforms for driving an electric motor in exemplary embodiments.
Figure 5B:
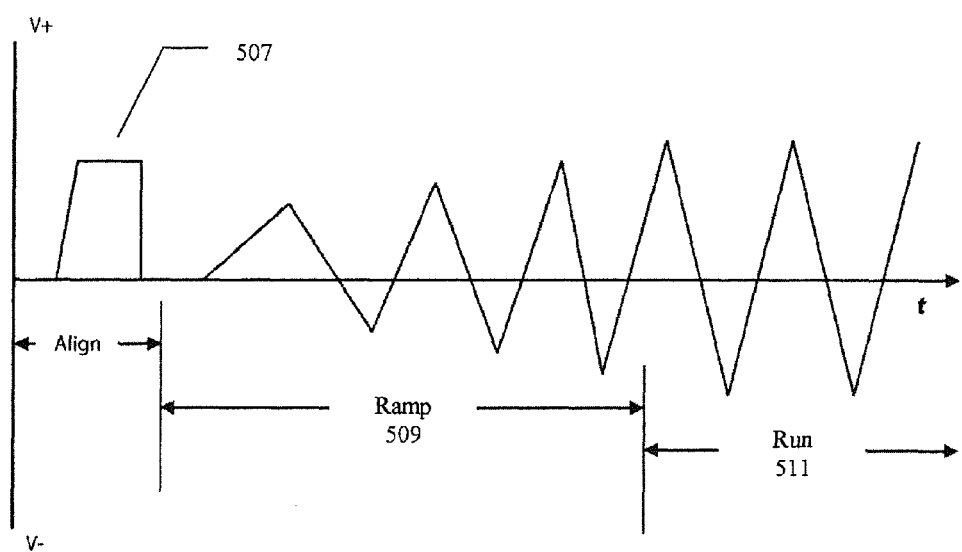

FIG. 5A depicts an exemplary BEMF waveform 505. Pulse width modulation (PWM) pulses 501 and 503 are designed to approximate the BEMF waveform 505. As can be seen, the middle of PWM pulses 501 and 503 coincides with the maximum and minimum of the BEMF waveform, respectively. Thus, the PWM waveform approximates the counter-electromotive force of the motor as described above.

FIG. 5B depicts an exemplary drive waveform for a start-up sequence comprising an alignment pulse 507, a ramp-up period 509, and a normal run period 511. The y-axis represents the drive voltage "V+" or "V−" applied to the motor winding, and the x-axis represents time "tn.

Figure 6:
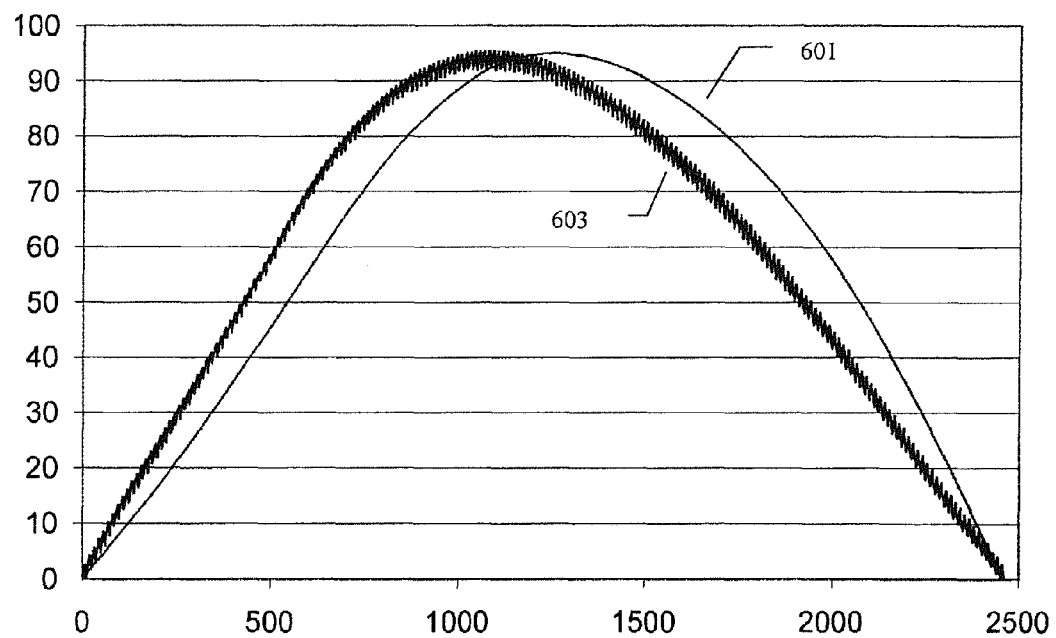
FIG. 6 depicts a drive waveform for driving an electric motor in an exemplary embodiment.

FIG. 6 depicts a graph of an exemplary counter-electromotive force 601 and drive current amplitude 603. The x-axis represents frequency in RPM, and the y-axis represents duty cycle as a percentage. As can be seen, the drive waveform 603 closely approximates the BEMF waveform 601.

FIGS. 7A-7B depict an exemplary BEMF look-up table having 64 data points. Each data point comprises an index and a duty-cycle value (as a percentage).

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof. It should be understood that the embodiments disclosed herein include any and all combinations of features as disclosed herein and/or described in any of the dependent claims.

The invention claimed is:

1. A motor system comprising:
   an electric motor comprising: a stator, a rotor, a permanent magnet, and a winding;
   a single-phase electric power supply circuit configured to receive an alternating current having a first frequency and provide electric power to the electric motor; and
   a motor controller comprising a processor and a memory, the motor controller being configured to control the single-phase electric power supply circuit, the processor being configured to execute a motor control software that (a) receives position data indicative of rotor position, and (b) based on the received position data, electronically commutates the electric motor at a second frequency not equal to the first frequency, the memory comprising a lookup table that stores a digital representation of a counter-electromotive force waveform associated with the electric motor, the digital representation comprising a triangle waveform approximation of the counter-electromotive force waveform.

2. The motor system of claim 1, wherein the second frequency is greater than the first frequency.

3. The motor system of claim 1, wherein the second frequency is less than the first frequency.

4. The motor system of claim 1, wherein the second frequency is less than line frequency.

5. The motor system of claim 1, Wherein the single-phase electric power supply circuit comprises a pulse width modulation circuit; and wherein the motor control software is further configured to (c) generate an index into the look-up table based on the received position data, (d) retrieve a value stored in the lookup table at the generated index, and (e) control the pulse width modulation circuit based on the retrieved value to thereby drive the electric motor with a drive waveform that is substantially similar to the counter-electromotive force waveform.

6. The motor system of claim 5, wherein the configuration of the motor control software to generate the index into the look-up table comprises calculating the sum of a waveform angle and an advance angle.

7. The motor system of claim 6, further comprising a Hall sensor; wherein the position data comprises one of a rising edge and a falling edge; and wherein the waveform angle is 0 degrees for a rising edge and 180 degrees for a falling edge.

8. The motor system of claim 5, wherein the motor control software is further configured to (f) start the electric motor in a predetermined start direction.

9. The motor system of claim 8, wherein the motor control software comprises a pulse width modulation routine; and wherein the motor control software is configured to start the electric motor in a predetermined start direction by executing a start-up sequence that comprises driving the motor with an alignment pulse that comprises a single polarity pulse width modulation burst.

10. The motor system of claim 9, wherein the start-up sequence further comprises driving the started motor in a ramp-up mode by applying a gradually increasing frequency of pulse width modulation pulses to the winding.

11. The motor system of claim 1, wherein the permanent magnet comprises exactly two poles or exactly four poles.

12. The motor system of claim 1, wherein the single-phase electric power supply circuit further comprises a split rail circuit.

13. The motor system of claim 1, wherein the stator is a "c" core-type stator.

14. The motor system of claim 1, wherein the motor controller is separate from the electric motor.

15. The motor system of claim 14, wherein the motor system is part of a device or appliance and the motor controller is integrated with a main control system for the device or the appliance.

16. A system comprising:

a fluid moving component;

an electric motor for driving the fluid moving component and comprising: a stator, a rotor, a permanent magnet, and a winding;

a single-phase electric power supply circuit configured to receive an alternating current having a first frequency and provide electric power to the electric motor; and a motor controller comprising a processor and a memory, the motor controller being configured to control the single-phase electric power supply circuit, the processor being configured to execute a motor control software that (a) receives position data indicative of rotor position, and (b) based on the received position data, electronically commutates the electric motor at a second frequency not equal to the first frequency, the memory comprising a lookup table that stores a digital representation of a counter-electromotive force waveform associated with the electric motor, the digital representation comprising a triangle waveform approximation of the counter-electromotive force waveform.

17. The system of claim 16, wherein the motor controller is separate from the electric motor.

18. The system of claim 16, wherein the system is part of a device or appliance and the motor controller is integrated with a main control system for the device or the appliance.

19. The system of claim 16, wherein the fluid moving component is an impeller for moving liquids.

* * * * *